(12) United States Patent
Hung (10) Patent No.: US 9,068,467 B2
(45) Date of Patent: Jun. 30, 2015

(54) ELECTRIC POWER GENERATION ASSEMBLY

(71) Applicant: Chuan-Yu Hung, Caotun Township, Nantou County (TW)

(72) Inventor: Chuan-Yu Hung, Caotun Township, Nantou County (TW)

(*) Notice: Subject to any disclaimer, the term of this patent is extended or adjusted under 35 U.S.C. 154(b) by 158 days.

(21) Appl. No.: 13/952,066

(22) Filed: Jul. 26, 2013

(65) Prior Publication Data

US 2015/0028596 A1  Jan. 29, 2015

(51) Int. Cl.
*F01D 15/10* (2006.01)

(52) U.S. Cl.
CPC ......... *F01D 15/10* (2013.01); *F05B 2240/9113* (2013.01)

(58) Field of Classification Search
CPC ................... F05B 2240/9113; F05B 2240/941
USPC ......................................... 290/1 R
See application file for complete search history.

(56) References Cited

U.S. PATENT DOCUMENTS

| 4,173,431 | A  | * | 11/1979 | Smith | 417/229 |
|---|---|---|---|---|---|
| 5,355,674 | A | * | 10/1994 | Rosenberg | 60/325 |
| 2005/0001430 | A1 | * | 1/2005 | Ricketts | 290/1 R |
| 2005/0200132 | A1 | * | 9/2005 | Kenney | 290/1 R |
| 2008/0157537 | A1 | * | 7/2008 | Richard | 290/1 R |
| 2012/0112471 | A1 | * | 5/2012 | Karoglan | 290/1 R |

* cited by examiner

*Primary Examiner* — Tulsidas C Patel
*Assistant Examiner* — Sean Gugger
(74) *Attorney, Agent, or Firm* — Muncy, Geissler, Olds & Lowe, P.C.

(57) ABSTRACT

An electric power generation assembly includes a frame, an intake unit, an air storage unit, two water tanks, two pulling units and a power generating unit. The intake unit has an air bag to which an inhale tube and an exhale tube are connected. The air storage unit has an air tank whose underside is connected to the exhale tube. The two water tanks each have a pressure tube which is connected to the air tank. The two pulling units are respectively located in the water tanks and each include multiple stationary pulleys, a float, a release valve, an air hose connected to the pressure tube and a cable. The release valve is connected to the top of the float and the air hose is connected to the float. The cable is connected between the two floats via the stationary pulleys. The power generating unit is connected to the cables.

8 Claims, 9 Drawing Sheets

ELECTRIC POWER GENERATION ASSEMBLY

FIELD OF THE INVENTION

The present invention relates to an electric power generation assembly, and more particularly, to an electric power generation assembly that can continuously generate and store electric power.

BACKGROUND OF THE INVENTION

The green energy is a trend for the energy source of the feature such as the solar energy, the wind power and the hydraulic power, wherein the solar energy requires sunny days and the wind power requires large blades and large area along the cost, and the hydraulic power requires rivers with plenty of water. These green energy can be used to generate electric power, but due to the restrictions mentioned above, the power generation processes cannot be continuous so that the results can be vary. Most of the power generation equipments have to be set on the area with low density of population and involve high cost.

The present invention intends to provide an electric power generation assembly capable of continuously generating and storing electric power.

SUMMARY OF THE INVENTION

The present invention relates to an electric power generation assembly and comprises a frame, an intake unit, an air storage unit, two water tanks, two pulling units and a power generating unit. The intake unit has an air bag to which an inhale tube and an exhale tube are connected. The air storage unit has an air tank connected to the frame, and the underside of the air tank is connected to the exhale tube. The two water tanks are connected to the frame and each of the water tanks has a pressure tube connected to the underside thereof. The pressure tubes are connected to the air tank. The two pulling units are respectively located in the water tanks and each pulling unit comprises multiple stationary pulleys, a float, a release valve, an air hose connected to the pressure tube, and a cable, The stationary pulleys are located in the water tank and the top of the frame respectively. The release valve is connected to the top of the float and the air hose is connected to the lower end of the float. The cables are connected between the two floats. The power generating unit is connected to the top of the frame and has a charging member. The power generating unit is connected with the cables.

Preferably, the air bag is made by flexible material.

Preferably, a filter is connected to the inhale tube of the air bag.

Preferably, a pump is connected with the air tank, and a valve with a gauge is connected between the pump and the air tank.

Preferably, two touch switches are respectively located to the frame and the two release valves contact the touch switches respectively so as to release air iii the floats.

Preferably, the intake unit has a bottom board and two inclined boards are connected to two ends of the bottom board. The air bag is located on the bottom board and a flat board is located on the air bag.

Preferably, the power generating unit has a gear set and a rack. The two cables are fixed to two ends of the rack which is engaged with the gear set.

Preferably, a rail is connected to the top of the frame and the rack is connected to the rail.

The primary object of the present invention is to provide an electric power generation assembly which is suitable for being set in areas with high density of population.

Another object of the present invention is to provide an electric power generation assembly which is less expensive and is operated easily.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 11, the electric power generation assembly of the present invention comprises a frame 10, an intake unit 20, an air storage unit 30, two water tanks 40, two pulling units 50 and a power generating unit 60.

Figure 1:
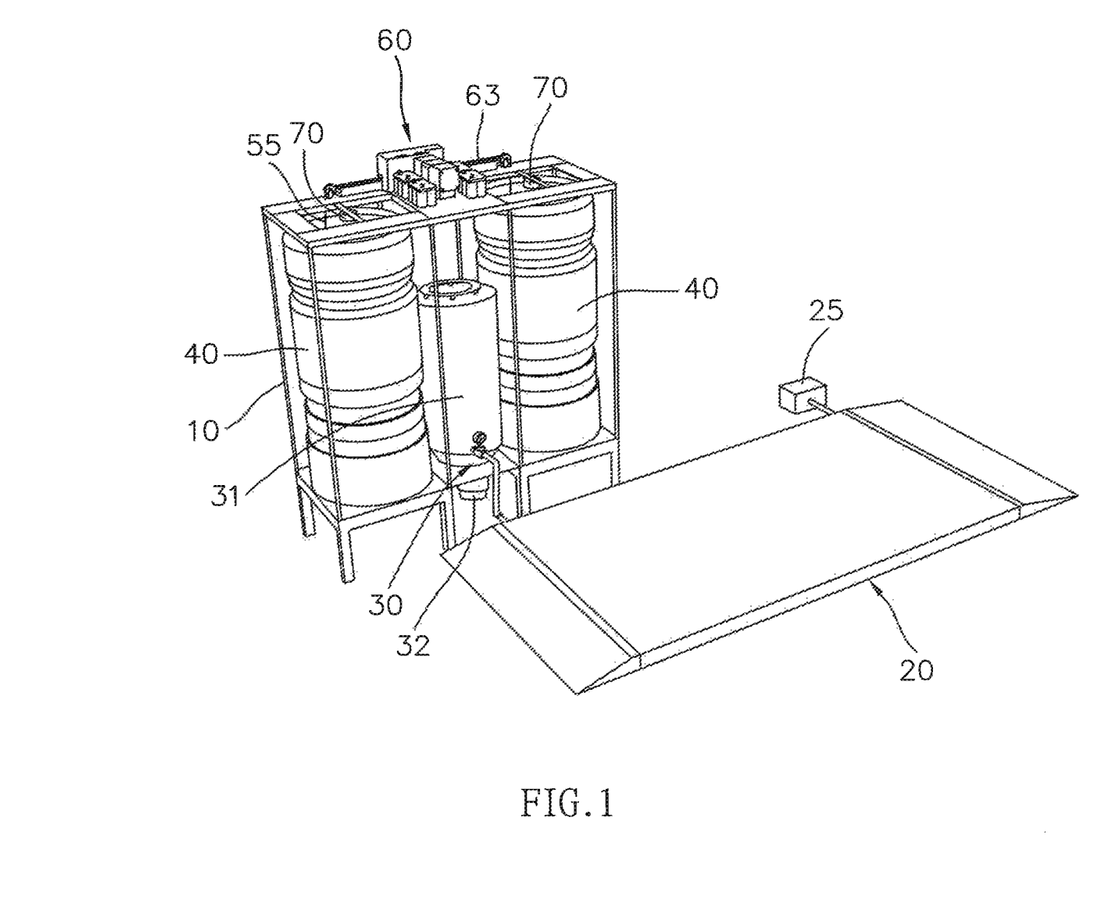
FIG. 1 is a perspective view to show the electric power generation assembly of the present invention.
Figure 2:
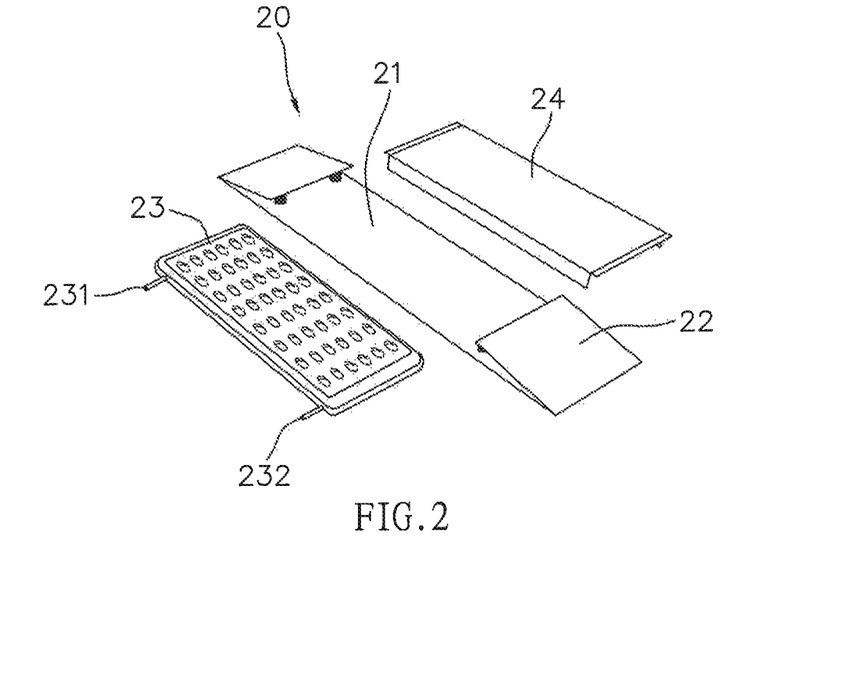
FIG. 2 is an exploded view to show the intake unit of the present invention.
Figure 3:
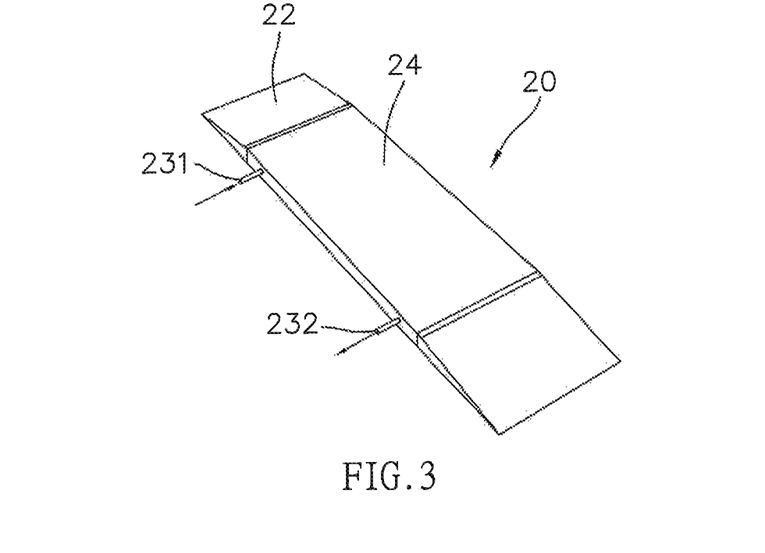
FIG. 3 is a perspective view to show the intake unit of the present invention.

As shown in FIGS. 2 and 3, the intake unit 20 has a bottom board 21 and two inclined boards 22 are connected to two ends of the bottom board 21. An air bag 23 is located on the bottom board 21 and a flat board 24 is located on the air bag 23. An inhale tube 231 and an exhale tube 232 are connected to one side of the air bag 23. The air bag 23 is made by flexible material.

Figure 4:
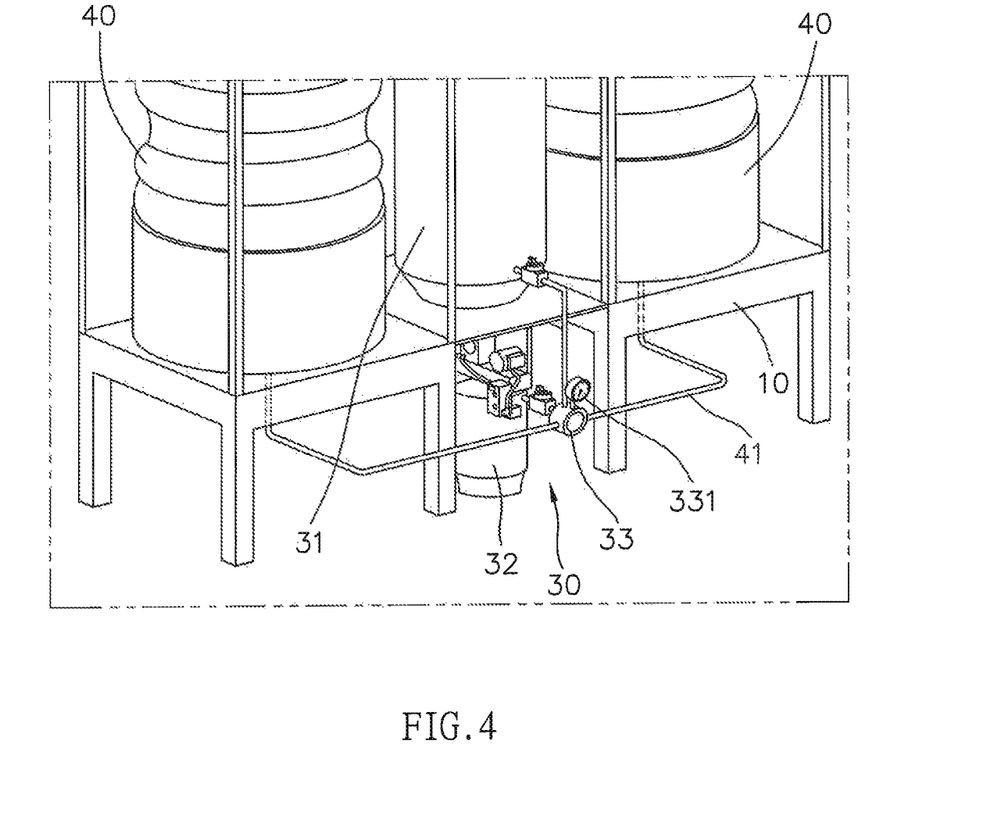
FIG. 4 is an enlarged view to show the air storage unit of the present invention.

The air storage unit 30 has an air tank 31 connected to the frame 10. The underside of the air tank 31 is connected to the exhale tube 232 of the air bag 23.

Two water tanks 40 are connected to the frame 10 and each of the water tanks 40 has a pressure tube 41 connected to the underside thereof. The pressure tubes 41 are respectively connected to the air tank 31. The water tanks 40 store water therein, however, oil, sea water or other liquid can also be used.

The two pulling units 50 are respectively located in the water tanks 40 and each pulling unit 50 comprises multiple stationary pulleys 51, a float 52, a release valve 53, an air hose 54 connected to the pressure tube 41 and a cable 55. The stationary pulleys 51 are located in the water tank 40 and the top of the frame 10 respectively. The release valve 53 is connected to the top of the float 52 and the air hose 54 is connected to the lower end of the float 52. The cables 55 are connected between the two floats 52.

Figure 8:
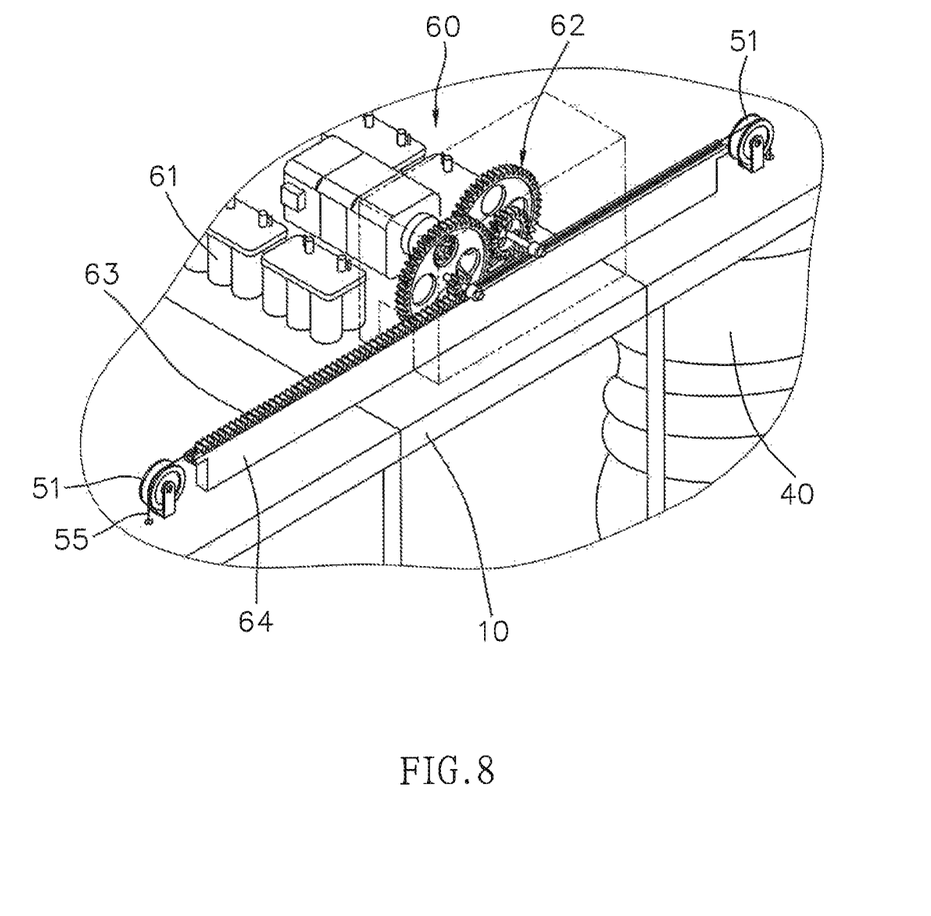
FIG. 8 is an enlarged view to show the power generating unit of the present invention.

The power generating unit 60 is connected to the top of the frame 10 and has a charging member 61. The power generating unit 60 is connected with the cables 55 such that when the cables 55 pull left and right, the power generation unit 60 generates power and charges the power to the charging member 61.

A filter 25 is connected to the inhale tube 231 of the air bag 23. A pump 32 is connected with the air tank 31, and a valve 33 with a gauge 331 is connected between the pump 32 and the air tank 31.

Two touch switches 70 are respectively located, to the frame 10. The two release valves 53 contact the touch switches 70 respectively so as to release air in the floats 52 when the floats 52 moves upward to the top of the water tanks 40.

The power generating unit 60 has a gear set 62 and a rack 63, and the two cables 55 are fixed to two ends of the rack 63. The rack 63 is engaged with the gear set 62. By left and right movement of the rack 63, the gear set 62 is activated to charge the charging member 61. In this embodiment, the rack 63 can be replaced by a chain.

A rail 64 is connected to the top of the frame 10 and the rack 63 is connected to the rail 64. When the cables 55 move left and right, the rack 63 is moved left and right on the rail 64.

Figure 9:
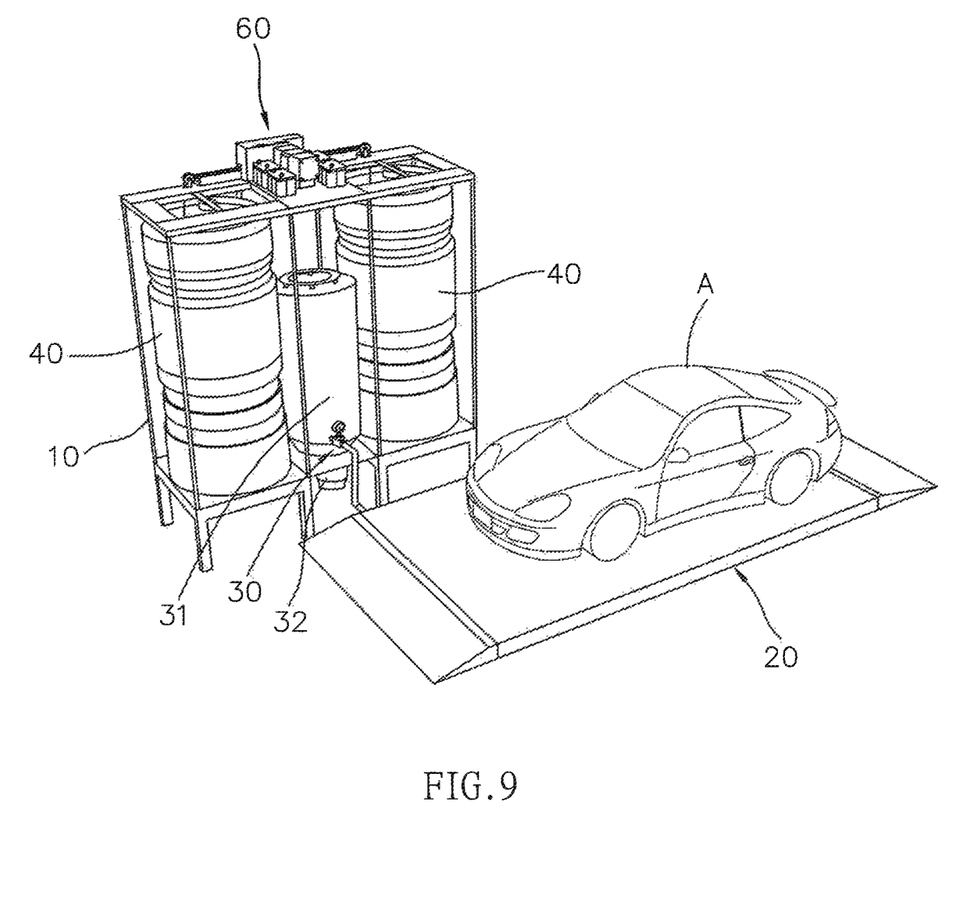
FIG. 9 shows that a vehicle runs over the intake unit of the power generating unit of the present invention.
Figure 10:
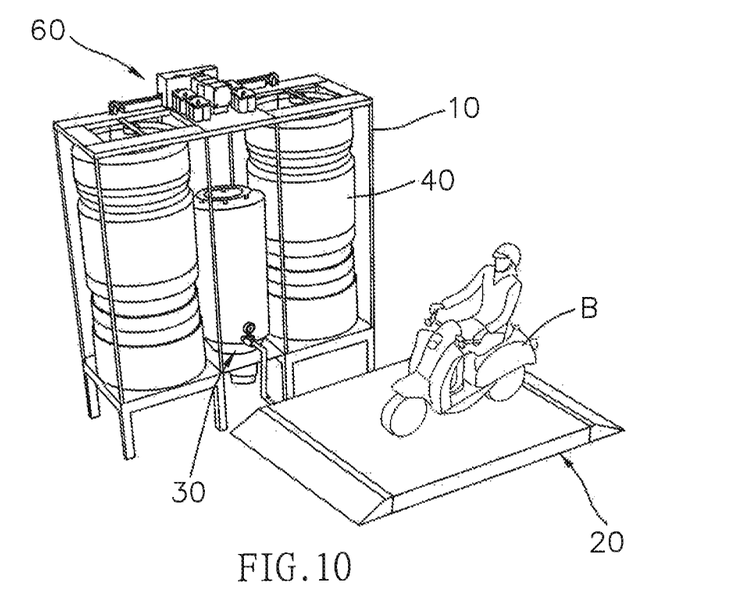
FIG. 10 shows that a motorbike runs over the intake unit of the power generating unit of the present invention.
Figure 11:
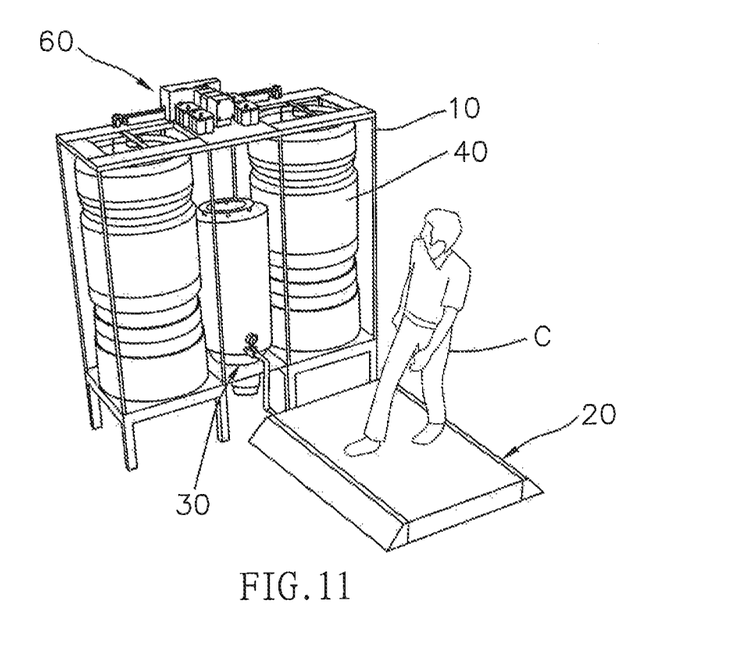
FIG. 11 shows that a pedestrian walks over the intake unit of the power generating unit of the present invention.

As shown in FIGS. 1 to 11, when a vehicle "A", a motorbike "B" or a pedestrian "C" moves over the flat board 24 as shown in FIGS. 9 to 11, the air bag 23 is compressed and the air pressure in the air bag 23 suddenly increases and the air releases from the exhale tube 232 and enters into the air tank 31.

When the vehicle "A", the motorbike "B" or the pedestrian "C" leaves from the flat board 24, the soft air bag 23 lifts the flat board 24 and the air is introduced into the air bag 23 via the inhale tube 231 to be ready for the next compression by the vehicle "A", the motorbike "B" or the pedestrian "C". The cycles can be repeated again and again.

The air tank 31 releases the air and sucks the air repeatedly to increase the density and pressure. When the air pressure in the air tank 31 reaches the pre-set value, the exhale tube 232 shuts off automatically and no air is introduced into the air tank 31. The air generated by the air bag 23 is released from another touch switch 70. When the pressure in the air tank 31 drops to a pre-set value, the exhale tube 232 is opened automatically and introduces air into the air tank 31.

Figure 5:
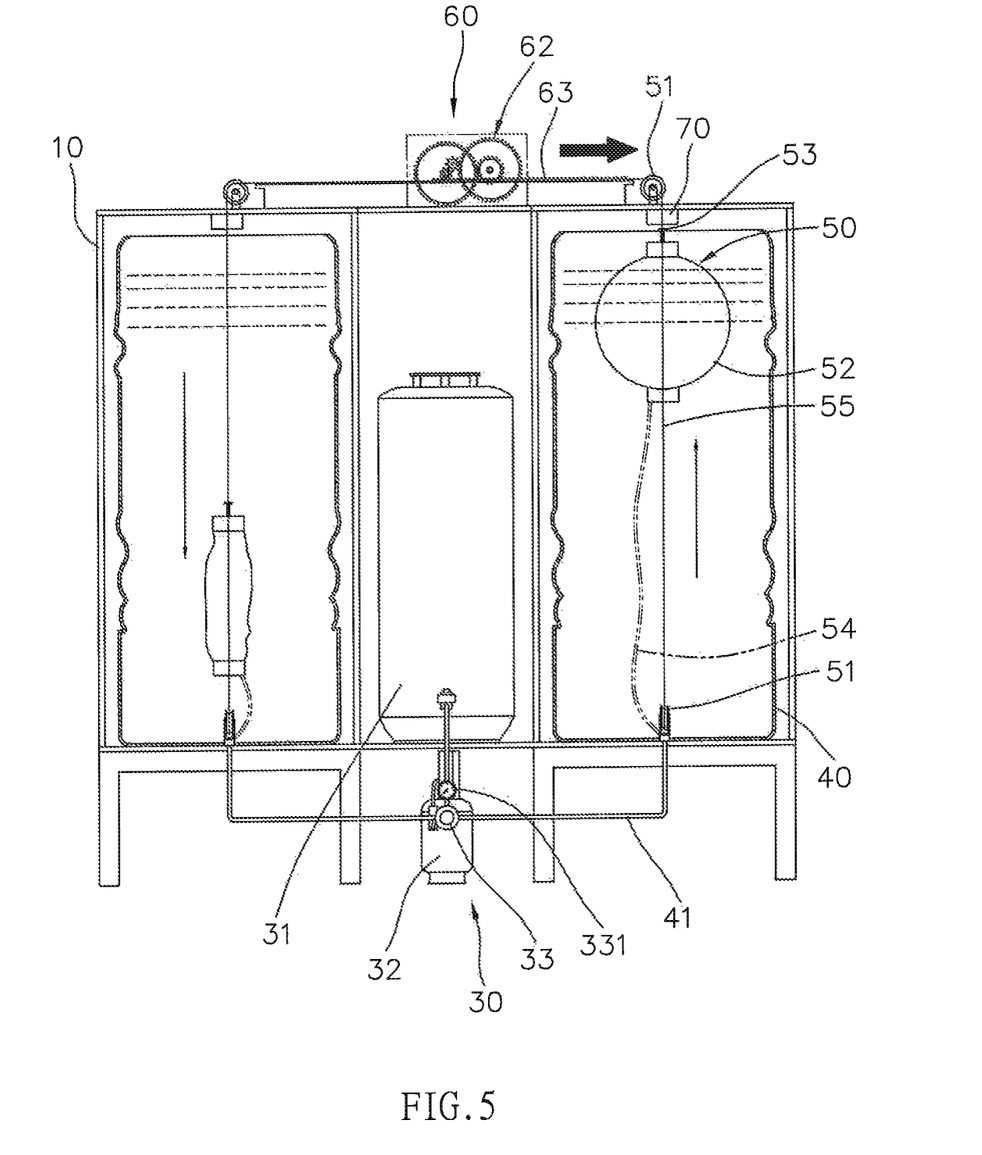
FIG. 5 shows the operation of the electric power generation assembly of the present invention.

The air tank 31 is cooperated with an automatic controller (not shown) to release the air by a pre-set mode. The air in the air tank 31 is sent to the floats 52 by the pressure tubes 41. When the air is full in the floats 52, the supply of air is cut off as shown in FIG. 5.

Figure 6:
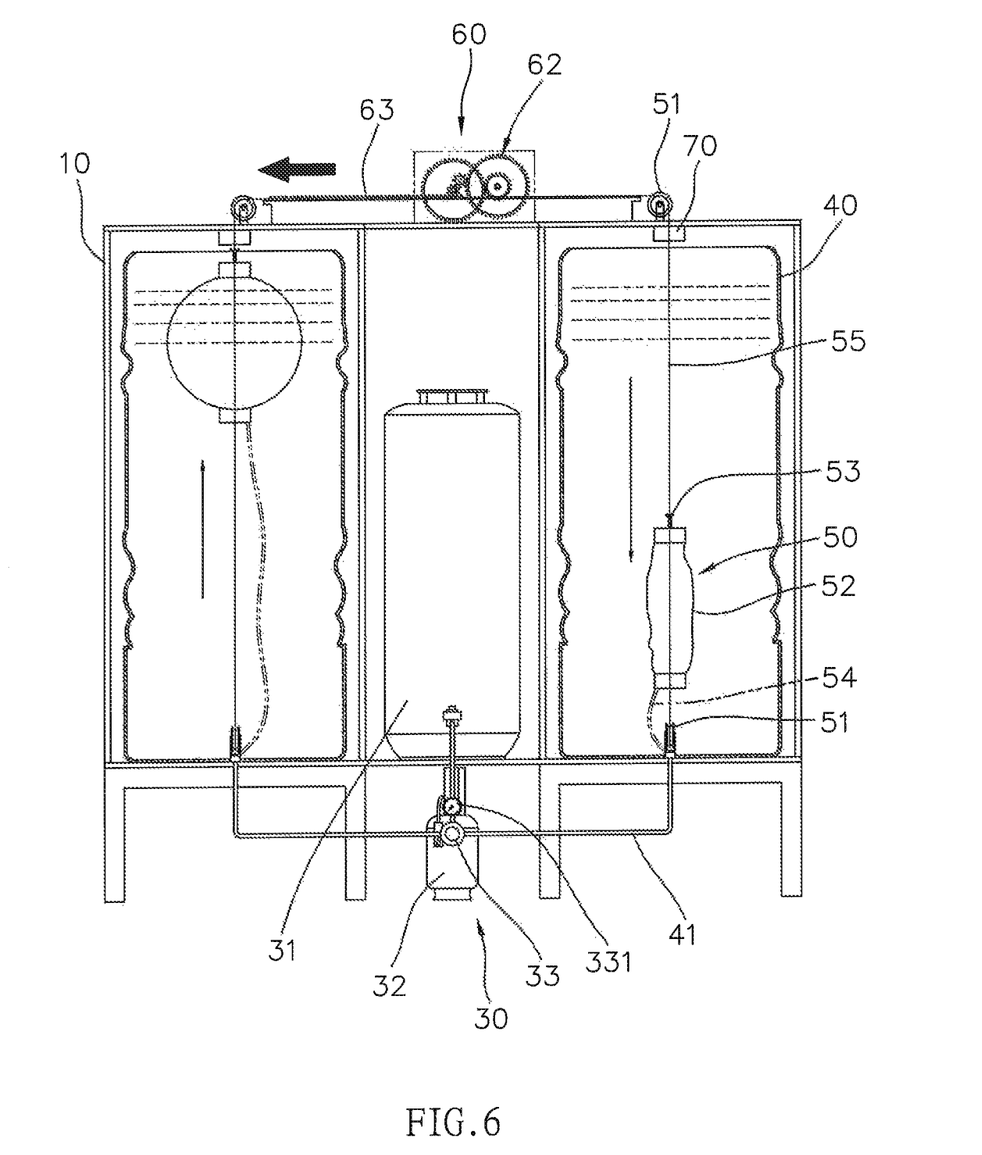
FIG. 6 is another view to show the operation of the electric power generation assembly of the present invention.
Figure 7:
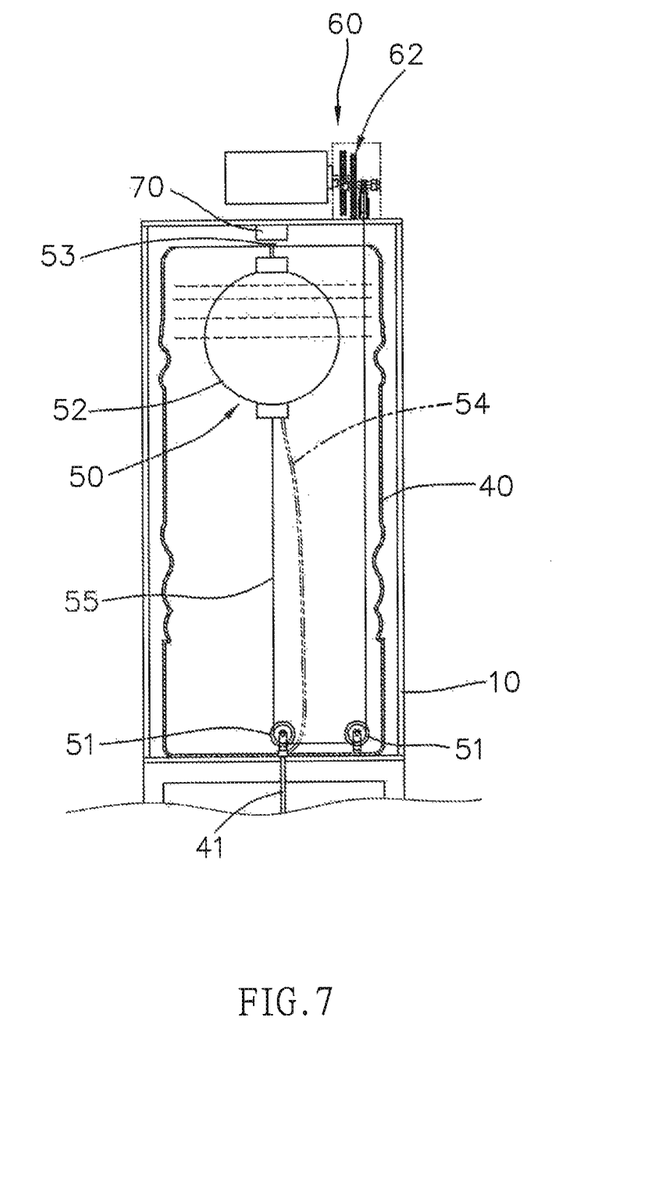
FIG. 7 is a side cross sectional view of the electric power generation assembly of the present invention.

In the same time, when the air in the floats 52 is full, the floats 52 float upward to let the cables 55 to move left or right, such that the rack 63 is moved left or right. When the floats 52 reach the top of the water tanks 40, the floats 52 touch the release valves 53 to release the air in the floats 52. Therefore, the floats 52 are lowered gradually as shown in FIGS. 5 and 6. By the repeated left-and-right operation of the rack 63, a high torque is output.

Because the cables 55 are moved by the float force from the floats 52, the distance of the cables 55 is significant and the power generating unit 60 uses the energy to generate power. The left and right movements of the rack 63 activate the gear set 62 so as to charge the charging member 61. Therefore, the present invention can generate power and store power.

When the air bag 23 is not compressed continuously such as during the night, the air pressure in the air tank 31 cannot fill the floats 52, the energy in the charging member 61 is used to activate the pump 32 to provide air into the air bag 23. The floats 52 are able to be filled with air and the power generating unit 60 can continuously generate power. The power generated by the power generating unit 60 is much larger than the power required by the pump 32, so that the small amount power used to activate the pump 32 can activate the floats 52, the cables 55, the rack 63 and the gear set 62, so that the power generated from the power generating unit 60 is much larger than the output of the charging member 61. The efficiency of generating power is increased.

The power generating assembly of the present invention does not affect by weather and the size of the land, and the power stored can be output by a transformer (not shown) to areas that need power. The present invention is suitable for being set in areas with high density of population so as to provide power continuously such as residential areas, public areas, basements, parking lots, traffic signals, lights, electric-powered doors, entrance of shopping malls, industrial parks and toll stations. The present invention can be set along roads to provide sufficient power to the street lights and does not pollute the environment.

While we have shown and described the embodiment in accordance with the present invention, it should be clear to those skilled in the art that further embodiments may be made without departing from the scope of the present invention.

What is claimed is:

1. An electric power generation assembly comprising:
a frame;
an intake unit having an air bag to which an inhale tube and an exhale tube are connected;
an air storage unit having an air tank connected to the frame, an underside of the air tank connected to the exhale tube;
two water tanks connected to the frame and each of the water tanks having a pressure tube connected to an underside thereof, the pressure tubes connected to the air tank;
two pulling units respectively located in the water tanks and each pulling unit comprising multiple stationary pulleys, a float, a release valve, an air hose connected to the pressure tube and a cable, the stationary pulleys located in the water tank and a top of the frame respectively, the release valve connected to a top of the float and the air hose connected to a lower end of the float, the cables connected between the two floats, and
a power generating unit connected to the top of the frame and having a charging member, the power generating unit connected with the cables;
wherein power generation is achieved by compression of the air bag pressurizing the air tank, and once the pressure in the air tank reaches an upper limit, introducing air into the floats, resulting in movement of the cables connected to the generator.

2. The electric power generation assembly as claimed in claim 1, wherein the air bag is made by flexible material.

3. The electric power generation assembly as claimed in claim 1 wherein a filter is connected to the inhale tube of the air bag.

4. The electric power generation assembly as claimed in claim 1, wherein a pump is connected with the air tank, and a valve with a gauge is connected between the pump and the air tank.

5. The electric power generation assembly as claimed in claim 1, wherein two touch switches are respectively located to the frame and the two release valves contact the touch switches respectively so as to release air in the floats.

6. The electric power generation assembly as claimed in claim 1, wherein the intake unit has a bottom board and two inclined boards are connected to two ends of the bottom board, the air bag is located on the bottom board and a flat board is located on the air bag.

7. The electric power generation assembly as claimed in claim 1, wherein the power generating unit has a gear set and a rack, the two cables are fixed to two ends of the rack, the rack is engaged with the gear set.

8. The electric power generation assembly as claimed in claim 7, wherein a rail is connected to the top of the frame and the rack is connected to the rail.

\* \* \* \* \*